(12) United States Patent
Douillet

(10) Patent No.: US 7,856,104 B2
(45) Date of Patent: Dec. 21, 2010

(54) SYSTEM AND METHOD FOR ENSURING SECURE COMMUNICATION BETWEEN TV AND SET BACK BOX

(75) Inventor: Ludovic Douillet, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 990 days.

(21) Appl. No.: 11/702,280

(22) Filed: Feb. 5, 2007

(65) Prior Publication Data

US 2008/0186403 A1    Aug. 7, 2008

(51) Int. Cl.
*H04N 7/015* (2006.01)
*H04N 7/16* (2006.01)
*H04N 7/167* (2006.01)

(52) U.S. Cl. .................. 380/223; 725/25; 725/31; 380/210

(58) Field of Classification Search .............. 725/31, 725/25, 151–153; 380/223, 210
See application file for complete search history.

(56) References Cited

U.S. PATENT DOCUMENTS

| 2002/0118833 A1* | 8/2002 | Benoit .................... 380/210 |
| 2003/0021418 A1 | 1/2003 | Arakawa et al. ........... 380/277 |
| 2007/0037528 A1* | 2/2007 | Doan et al. ............... 455/101 |
| 2007/0098179 A1* | 5/2007 | Nave ...................... 380/286 |

FOREIGN PATENT DOCUMENTS

WO    2001/072009 A2    9/2001

* cited by examiner

*Primary Examiner*—Kimyen Vu
*Assistant Examiner*—Edward Zee
(74) *Attorney, Agent, or Firm*—John L. Rogitz

(57) ABSTRACT

A random number or HDCP key is sent from a TV to a set back box (SBB) over a HDMI channel, and unless the SBB returns the same random number/key to the TV over a USB link, the TV will not communicate further with the SBB.

15 Claims, 3 Drawing Sheets

SYSTEM AND METHOD FOR ENSURING SECURE COMMUNICATION BETWEEN TV AND SET BACK BOX

FIELD OF THE INVENTION

The present invention relates generally to systems and methods for ensuring secure communications between a TV and a set top box/set back box.

BACKGROUND OF THE INVENTION

The venerable "rabbit ears" TV antennas have become a rarity on the modern TV, which instead typically receives cable TV signals and/or satellite TV signals and/or recorded content from sources such as, e.g., digital video recorders (DVR) and digital video disk (DVD) players through a receiver broadly referred to as a "set top box" (STB). A type of STB is the so-called "set back box" (SBB) which differs from a STB chiefly by being controlled by the same remote control that controls the TV. The term "set box" (SB) is used herein to denote either a STB or a SBB.

With the advent of high resolution digital TVs such as high definition TVs (HDTVs), to extend communication protocols to digital multimedia that includes audio for the purpose of, e.g., playing digital movies and the like, a protocol referred to as High Definition Multimedia Interface (HDMI) has been developed. HDMI is similar to Digital Visual Interface (DVI), a protocol developed primarily for computers that consequently does not envision processing audio data, except that HDMI envisions the use of audio as well as video data and it adds television-related resolutions. Both DVI and HDMI are intended for wired transmission, and HDMI further permits the encryption of digital multimedia using an encryption method known as High-Bandwidth Digital Content Protection (HDCP), which may also be used with DVI.

An advantageous feature of HDMI is that it supports consumer electronics control (CEC), which permits control of the source (SB/DVD player/DVR etc.) and the TV using a single remote control. However, as understood herein, display icon exchange is typically effected between a SB and a TV, and the data exchange when using the HDMI channel is noticeably slow to a viewer in effecting the icon exchange. Accordingly, the present invention recognizes that in addition to a HDMI communication path, a second path such as a universal serial bus (USB) path can be provided which is dedicated to icon exchange as well as to the transmission of certain control commands.

As still further recognized herein, owing to the use of a second path such as a USB channel for the purposes discussed above, it would be possible for someone to plug a personal computer into the TV's USB port and, possibly by spoofing the TV into thinking the PC is a SB, obtain sensitive information on the details of the data exchange between a SB or other content source and a TV. In this way, the protections otherwise afforded by HDCP undesirably might be compromised. Accordingly, the invention herein is provided.

SUMMARY OF THE INVENTION

A method includes establishing a video communication channel such as a HDMI channel between a TV and a source of multimedia, and establishing a secondary communication channel such as a USB channel between the TV and the source, it being understood that the secondary communication channel may be a type of data path other than USB, e.g., RS232, I2C, etc. An encryption data element such as a HDCP key or random number is sent from the TV to the source over the video communication channel, with communication between the TV and source being prevented if the encryption data element is not returned to the TV from the source over the secondary communication channel.

The source can be a set box (SB) such as but not limited to a set back box (SBB). The secondary channel can be used for exchanging icon data.

In another aspect, a TV includes a display and a TV processor configured for communicating with a set box (SB) over both a High Definition Multimedia Interface (HDMI) channel and a universal serial bus (USB) channel. The processor uses the HDMI channel to send to the SB a TV-generated random number and/or a High-Bandwidth Digital Content Protection (HDCP) key associated with the TV. The TV processor is configured to receive back from the SB over the USB channel the random number and/or key.

In yet another aspect, a set box (SB) has a SB processor that is configured to communicate with a TV over both a High Definition Multimedia Interface (HDMI) channel and a secondary channel. The SB processor uses the HDMI channel to receive a TV-generated random number and/or a High-Bandwidth Digital Content Protection (HDCP) key that is associated with the TV. Also, the SB processor returns to the TV over the secondary channel the random number and/or key.

In still another aspect, a High-Bandwidth Digital Content Protection (HDCP) data element is exchanged between a TV and a SB using both a High Definition Multimedia Interface (HDMI) channel and a secondary channel to authenticate the SB and/or the TV.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
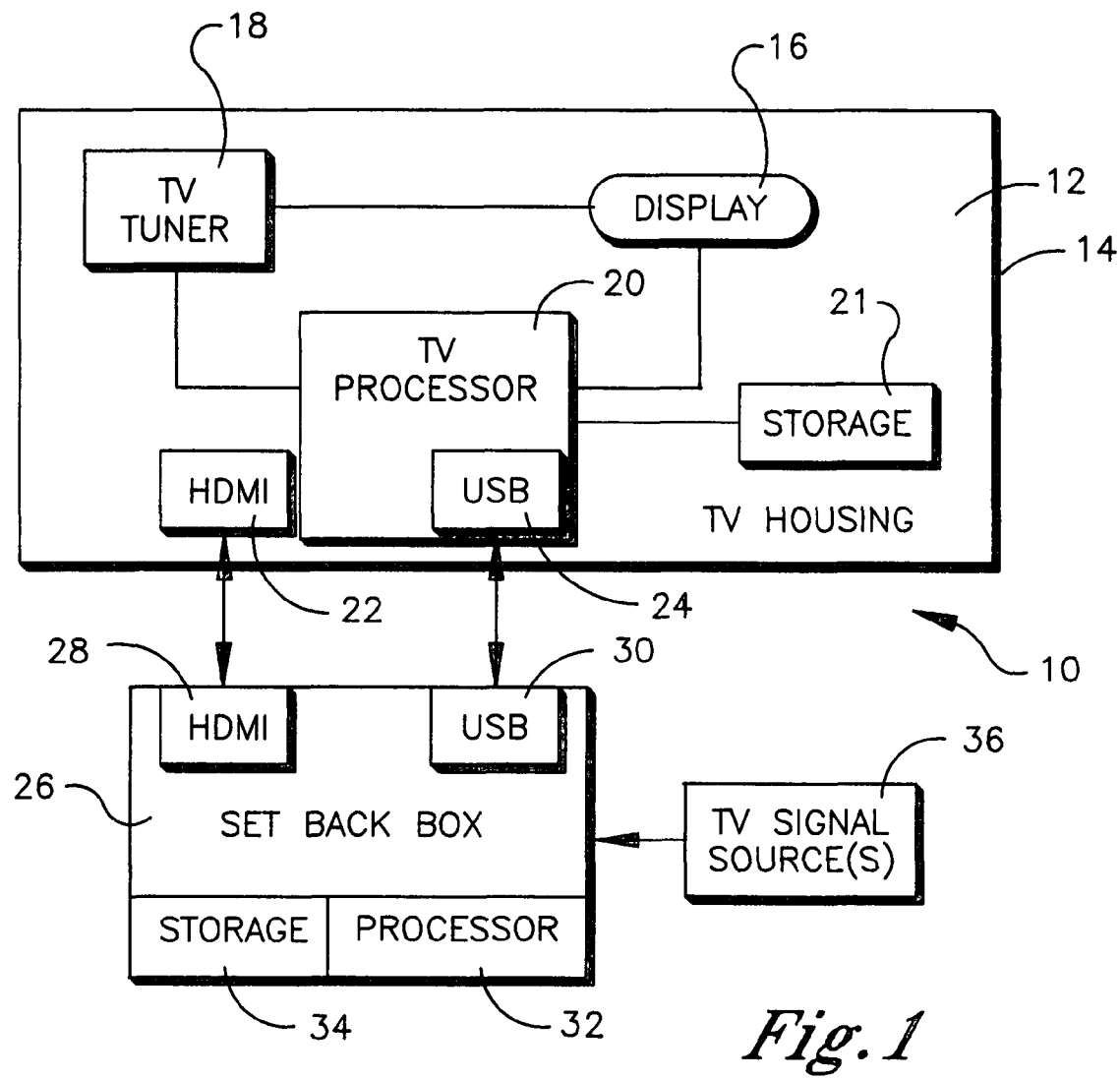
FIG. 1 is a block diagram of a non-limiting system according to the present invention.

Referring initially to FIG. 1, a system is shown, generally 10, that includes a TV 12 having a TV housing 14 supporting a TV display 16 and a TV tuner 18. The display 16 may but not must be a high definition TV display (HDTV) for displaying digital video.

A TV processor 20 is provided in the TV housing 14 for controlling the tuner 18 and/or display 16 and for executing portions of the logic set forth herein. The logic may be contained on a data storage medium 21 in the TV housing 14. The medium 21 may be, without limitation, random access memory (RAM), read-only memory (ROM), disk-based storage, etc.

The TV processor 20 includes a video communication channel port 22 and a secondary communication channel port 24. In the embodiment shown, the video communication channel port is a multimedia communication port that embodies HDMI while the secondary communication channel port 24 is a USB port, it being understood that in lieu of a USB data channel other types of data channels may be used, e.g., RS232, I2C, etc.

The TV processor 20 communicates with a source of multimedia using both ports 22, 24 in accordance with logic set forth further below. In one non-limiting implementation the source of multimedia is a set box (SB) and more particularly is a set back box (SBB) 26, although present principles may be applied to the authentication of other sources, e.g., DVD players, DVRs, etc.

In any case, the source, e.g., the SBB 26, includes ports 28 and 30 that are complementary to the ports 22, 24 of the TV 12. Thus, when the TV ports 22, 24 are HDMI and USB ports, respectively, the ports 28, 30 of the SBB 26 are also HDMI and USB ports, respectively. As further shown in FIG. 1, the SBB 26 may include a SBB processor 32 that can execute logic stored on a data storage medium 34 in accordance with principles set forth herein. Like the TV storage 21, the SBB data storage medium 34 may be, without limitation, random access memory (RAM), read-only memory (ROM), disk-based storage, etc. The SBB 26 may receive TV signals from a TV signal source 36 such as but not limited to cable head end.

Figure 2:
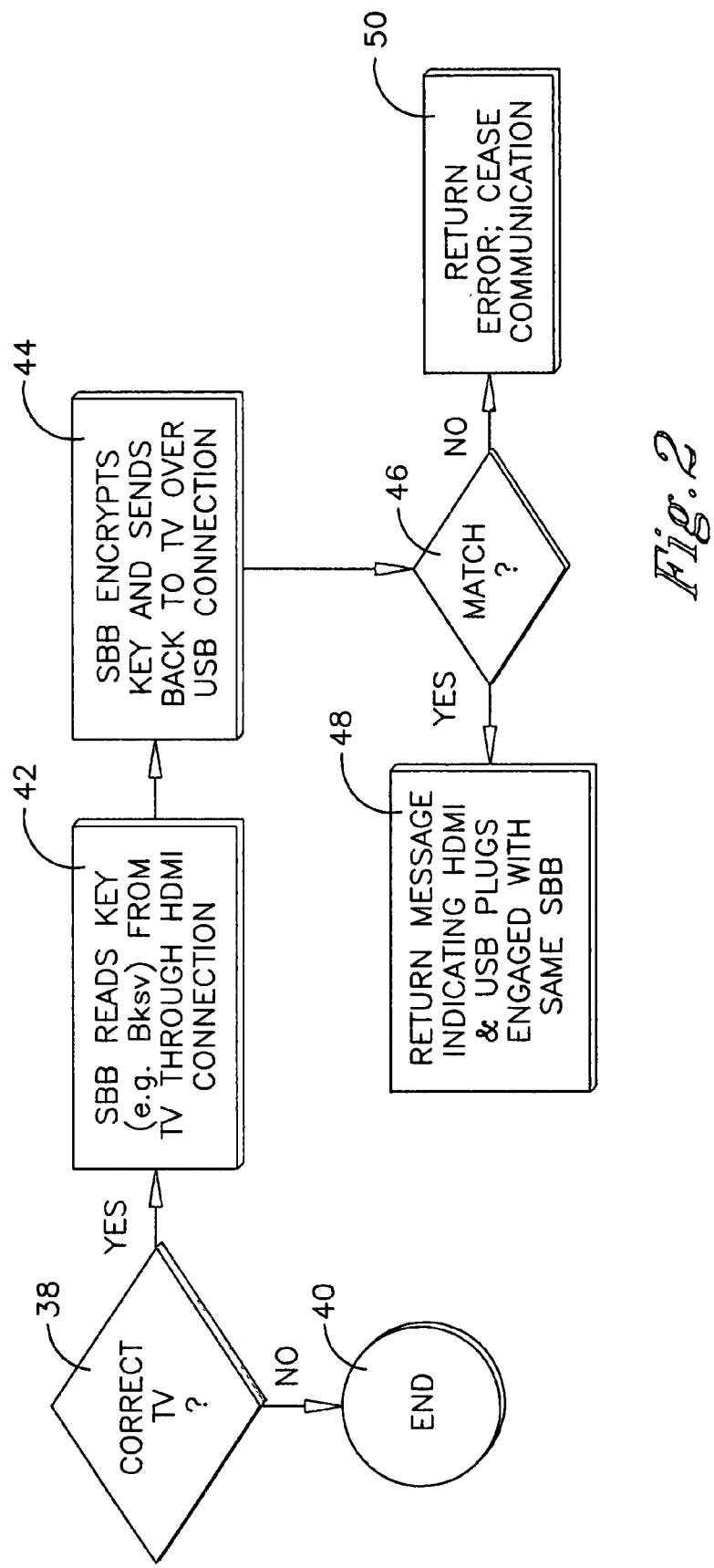
FIG. 2 is a flow chart of a first non-limiting logic for key exchange over the HDMI channel and USB channel.

Now referring to FIG. 2, one non-limiting logic flow may be seen. Commencing at decision diamond 38 it is determined whether the TV is a model that requires the present logic, i.e., whether the TV is programmed with the present logic. If not of course the logic ends at state 40, but otherwise the logic moves to block 42, wherein (preferably as part of HDCP authentication) the SB 26 reads an encryption element from the TV through the HDMI channel. In the logic of FIG. 2 the encryption element can be the HDCP key of the TV 12, e.g., the key colloquially referred to as "Bksv".

Proceeding to block 44, the SB 26 returns the encryption element to the TV 12 over the USB channel. When the TV's HDCP key is returned the SB 26 may encrypt it first, prior to sending it over the USB channel. At decision diamond 46 the TV compares the received encryption element (after decrypting it if necessary) with the encryption element that it sent to the SB 26 over the HDMI channel at block 42, and if a match is found the logic flows to block 48 to return a signal indicating that the HDMI and USB ports of the TV are properly engaged with respective ports of the SB 26. This signal may result in displaying a message to the user using the TV or not, but the import is that continued communication between the TV and SB is permitted.

In contrast, if the TV fails to find a matching encryption element returned over the USB channel at decision diamond 46, the logic moves to block 50 to return "error" or other signal indicating that communication between the TV and SB should cease, in that the SB was unable to return a proper encryption element over the USB channel. The TV 12 thereafter does not communicate with the SB 26 unless and until the logic is repeated with a match at decision diamond 46.

Figure 3:
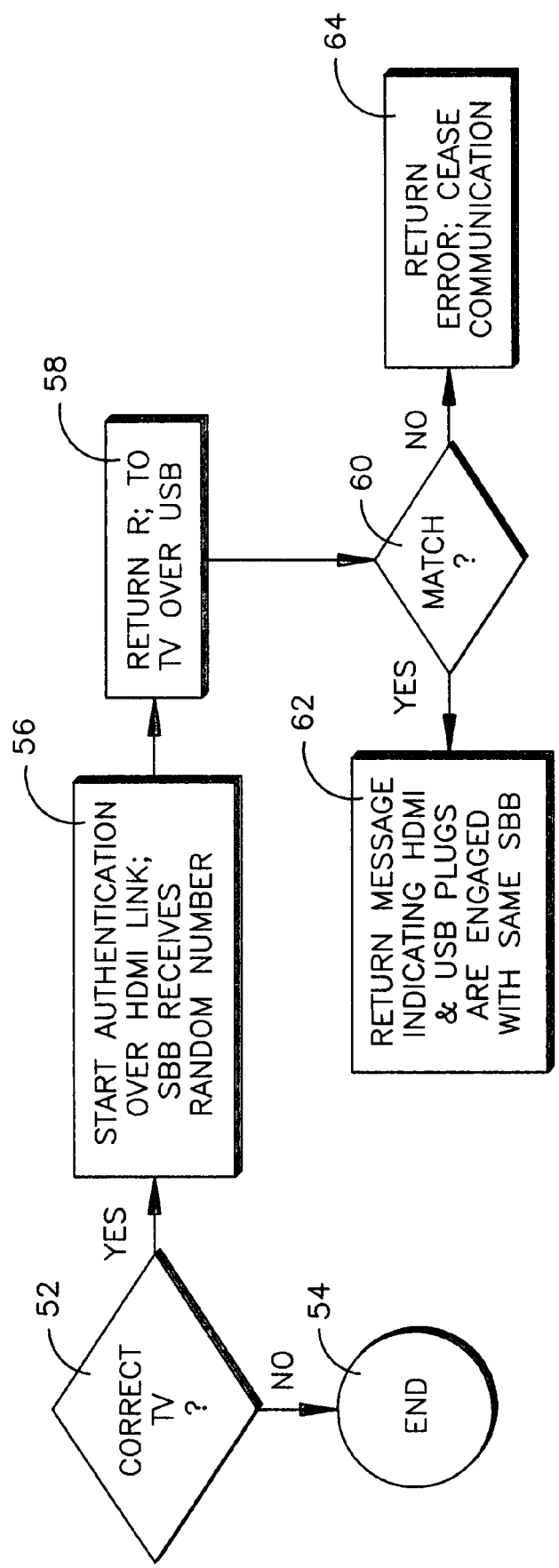
FIG. 3 is a flow chart of a second non-limiting logic for random number exchange over the HDMI channel and USB channel.

Now referring to FIG. 3, alternate logic is shown. Commencing at decision diamond 52 it is determined whether the TV is a model that requires the present logic, i.e., whether the TV is programmed with the present logic. If not of course the logic ends at state 54, but otherwise the logic moves to block 56, wherein (preferably as part of HDCP authentication) the SB 26 reads an encryption element from the TV through the HDMI channel. In the logic of FIG. 3 the encryption element can be a random number that is generated pursuant to HDCP authentication using the HDCP keys of the TV 12 and SB 26 colloquially referred to as "Bksv" and "Aksv" respectively.

Proceeding to block 58, the SB 26 returns the encryption element to the TV 12 over the USB channel. At decision diamond 60 the TV compares the received encryption element (after decrypting it if necessary) with the encryption element that it sent to the SB 26 over the HDMI channel at block 56, and if a match is found the logic flows to block 62 to return a signal indicating that the HDMI and USB ports of the TV are properly engaged with respective ports of the SB 26. This signal may result in displaying a message to the user using the TV or not, but the import is that continued communication between the TV and SB is permitted.

In contrast, if the TV fails to find a matching encryption element returned over the USB channel at decision diamond 60, the logic moves to block 64 to return "error" or other signal indicating that communication between the TV and SB should cease, in that the SB was unable to return a proper encryption element over the USB channel. The TV 12 thereafter does not communicate with the SB 26 unless and until the logic is repeated with a match at decision diamond 60.

The above logic may be executed more than once. For example, since the HDCP random number is generated periodically, each time a new random number is generated the logic above can be executed to ensure continued legitimate reception of data in the USB channel.

While the particular SYSTEM AND METHOD FOR ENSURING SECURE COMMUNICATION BETWEEN TV AND SET BACK BOX is herein shown and described in detail, it is to be understood that the subject matter which is encompassed by the present invention is limited only by the claims.

What is claimed is:

1. A method comprising:
    establishing a high definition multimedia interface (HDMI) video communication channel between a TV and a source of multimedia;
    establishing a serial bus secondary communication channel between the TV and the source;
    sending a High Bandwidth Digital Content Protection (HDCP) encryption data element from the TV to the source over the HDMI video communication channel; and
    preventing communication between the TV and source if the HDCP encryption data element is not returned to the TV from the source over the serial bus secondary communication channel.

2. The method of claim 1, wherein the source is a set box (SB).

3. The method of claim 1, wherein the source is a set back box (SBB).

4. The method of claim 1, wherein the serial bus secondary communication channel is a universal serial bus (USB) link or an RS232 link or an IC2 link.

5. The method of claim 4, wherein the USB link is used, and the USB link is used for exchanging at least icon data.

6. The method of claim 4, wherein the HDCP encryption data element is a random number generated by the TV.

7. The method of claim 4, wherein the HDCP encryption data element is a High-Bandwidth Digital Content Protection (HDCP) key associated with the TV.

8. A TV, comprising:
    at least one TV display; and
    at least one TV processor configured for communicating with a set box (SB) over both a High Definition Multimedia Interface (HDMI) channel and a universal serial bus (USB) channel, the at least one TV processor using the HDMI channel to send to the SB a TV-generated random number and/or a High-Bandwidth Digital Content Protection (HDCP) key associated with the TV, the at least one TV processor configured to receive back from the SB over the USB channel the random number and/or HDCP key.

9. The TV of claim 8, wherein if the TV does not receive back the random number and/or HDCP key over the USB channel the TV ceases communication with the SB.

10. A set box (SB) comprising:
a SB processor configured to communicate with a TV over both a High Definition Multimedia Interface (HDMI) channel and a secondary channel, the SB processor using the HDMI channel to receive a TV-generated random number and/or a High-Bandwidth Digital Content Protection (HDCP) key associated with the TV, the SB processor using the secondary channel to return to the TV the random number and/or HDCP key, wherein the secondary channel is a universal serial bus (USB) link or an RS232 link or an IC2 link.

11. The SB of claim 10, wherein the random number and/or HDCP key is encrypted by the SB prior to returning the random number and/or HDCP key to the TV over the secondary channel.

12. A method comprising:
exchanging a High-Bandwidth Digital Content Protection (HDCP) data element between a TV and a set box (SB) using both a High Definition Multimedia Interface (HDMI) channel and a secondary channel, wherein the HDCP data element is sent from the TV to the SB over the HDMI channel and the HDCP data element is returned to the TV by the SB over the secondary channel; and
using the HDCP data element to authenticate the SB and/or the TV, wherein the secondary channel is a universal serial bus (USB) link or an RS232 link or an IC2 link.

13. The method of claim 12, wherein the HDCP data element is an HDCP key and the secondary channel is the USB link.

14. The method of claim 12, wherein the HDCP data element is a random number.

15. The method of claim 14, wherein the random number is generated using an HDCP key associated with the TV and an HDCP key associated with the SB.

* * * * *